United States Patent
Jo et al.

(10) Patent No.: US 12,347,624 B2
(45) Date of Patent: Jul. 1, 2025

(54) MULTILAYER CAPACITOR HAVING INTERNAL ELECTRODES INCLUDING AN ALLOY

(71) Applicant: SAMSUNG ELECTRO-MECHANICS CO., LTD., Suwon-si (KR)

(72) Inventors: Soo Jeong Jo, Suwon-si (KR); Dae Hee Lee, Suwon-si (KR); Hyo Jin Kim, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 98 days.

(21) Appl. No.: 18/071,205

(22) Filed: Nov. 29, 2022

(65) Prior Publication Data

US 2023/0207217 A1    Jun. 29, 2023

(30) Foreign Application Priority Data

Dec. 27, 2021   (KR) .......................... 10-2021-0188006

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/232* | (2006.01) |

(52) U.S. Cl.
CPC .............. *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC ...... H01G 4/232; H01G 4/2325; H01G 4/008; H01G 4/12; H01G 4/012; H01G 4/30
See application file for complete search history.

(56) References Cited

U.S. PATENT DOCUMENTS

| | | | |
|---|---|---|---|
| 9,842,698 B2 | 12/2017 | Kisumi | |
| 2002/0096663 A1* | 7/2002 | Sato | .......................... C03C 8/18 |
| | | | 252/500 |

(Continued)

FOREIGN PATENT DOCUMENTS

| | | |
|---|---|---|
| JP | 2015-142235 A | 8/2015 |
| JP | 2016-171310 A | 9/2016 |

(Continued)

OTHER PUBLICATIONS

Office Action issued in corresponding Korean Patent Application No. 10-2021-0188006 dated May 29, 2025, with English translation.

*Primary Examiner* — David M Sinclair
(74) *Attorney, Agent, or Firm* — MORGAN, LEWIS & BOCKIUS LLP

(57) ABSTRACT

A multilayer capacitor includes a body including a dielectric layer and a plurality of internal electrodes stacked with the dielectric layer interposed therebetween and including a first conductive metal and external electrodes disposed on an external surface of the body and including a second conductive metal, wherein the ratio of internal electrodes including an alloy region of the first and second conductive metals to the plurality of internal electrodes is 40 to 80%.

14 Claims, 6 Drawing Sheets

(56) References Cited

U.S. PATENT DOCUMENTS

| | | | |
|---|---|---|---|
| 2009/0128989 A1* | 5/2009 | Suzuki | C04B 35/4682 |
| | | | 501/137 |
| 2011/0141657 A1* | 6/2011 | Jeon | H01G 4/2325 |
| | | | 361/321.1 |
| 2011/0149470 A1 | 6/2011 | Hur et al. | |
| 2011/0149471 A1* | 6/2011 | Hur | H01G 4/008 |
| | | | 361/321.2 |
| 2016/0042867 A1* | 2/2016 | Kisumi | H01G 4/12 |
| | | | 29/25.03 |
| 2016/0268046 A1 | 9/2016 | Nishisaka et al. | |
| 2017/0013623 A1 | 1/2017 | Chin et al. | |
| 2017/0018359 A1 | 1/2017 | Kimura et al. | |

FOREIGN PATENT DOCUMENTS

| | | |
|---|---|---|
| JP | 2019-130939 A | 8/2019 |
| KR | 10-1079382 B1 | 11/2011 |
| KR | 10-2015-013524 A | 12/2015 |
| KR | 10-2017-0009777 A | 1/2017 |

\* cited by examiner

MULTILAYER CAPACITOR HAVING INTERNAL ELECTRODES INCLUDING AN ALLOY

CROSS-REFERENCE TO RELATED APPLICATION(S)

This application claims benefit of priority to Korean Patent Application No. 10-2021-0188006 filed on Dec. 27, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor is a chip type condenser mounted on a printed circuit board (PCB) of various electronic products such as display devices including a liquid crystal display (LCD), a plasma display panel (PDP), and the like, computers, smartphones, mobile phones, and the like, to charge or discharge electricity.

Such a multilayer capacitor having advantages such as compactness, guaranteed high capacitance, and ease in the mounting thereof may be used as a component of various electronic devices. As many functions in fields requiring high reliability, such as electronic products, become electronalized and are in growing demand, multilayer capacitors also need high reliability. Factors that are problematic in the high reliability of multilayer capacitors include penetration of a plating solution occurring during a plating process, cracks due to external impacts, and the penetration of moisture from the outside.

In order to solve this problem, in a related art, a multilayer capacitor in which a nickel (Ni)-copper (Cu) alloy region is formed between internal electrodes and the external electrodes to improve a bonding strength between the internal electrodes and the external electrodes to prevent penetration of moisture and a plating solution has been developed.

However, when diffusion from the external electrodes to the internal electrodes of the multilayer capacitor occurs excessively, radiation cracks may occur due to a volume expansion of the internal electrodes, bending strength may be lowered due to the cracks, and penetration of a plating solution through the cracks may still occur.

SUMMARY

Exemplary embodiments improve moisture resistance reliability and high temperature IR characteristics of a multilayer capacitor.

Exemplary embodiments improve bonding strength between internal electrodes and external electrodes to prevent penetration of moisture and a plating solution from the outside.

Exemplary embodiments prevent an occurrence of cracks due to excessive alloy formation.

However, the object of the present disclosure is not limited to the above, and will be more easily understood in the course of describing specific exemplary embodiments of the present disclosure.

According to an aspect of the present disclosure, a multilayer capacitor includes: a body including a dielectric layer and a plurality of internal electrodes stacked with the dielectric layer interposed therebetween and including a first conductive metal; and external electrodes disposed on an external surface of the body and including a second conductive metal, wherein the ratio of internal electrodes including an alloy region of the first and second conductive metals to the plurality of internal electrodes is 40 to 80%.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
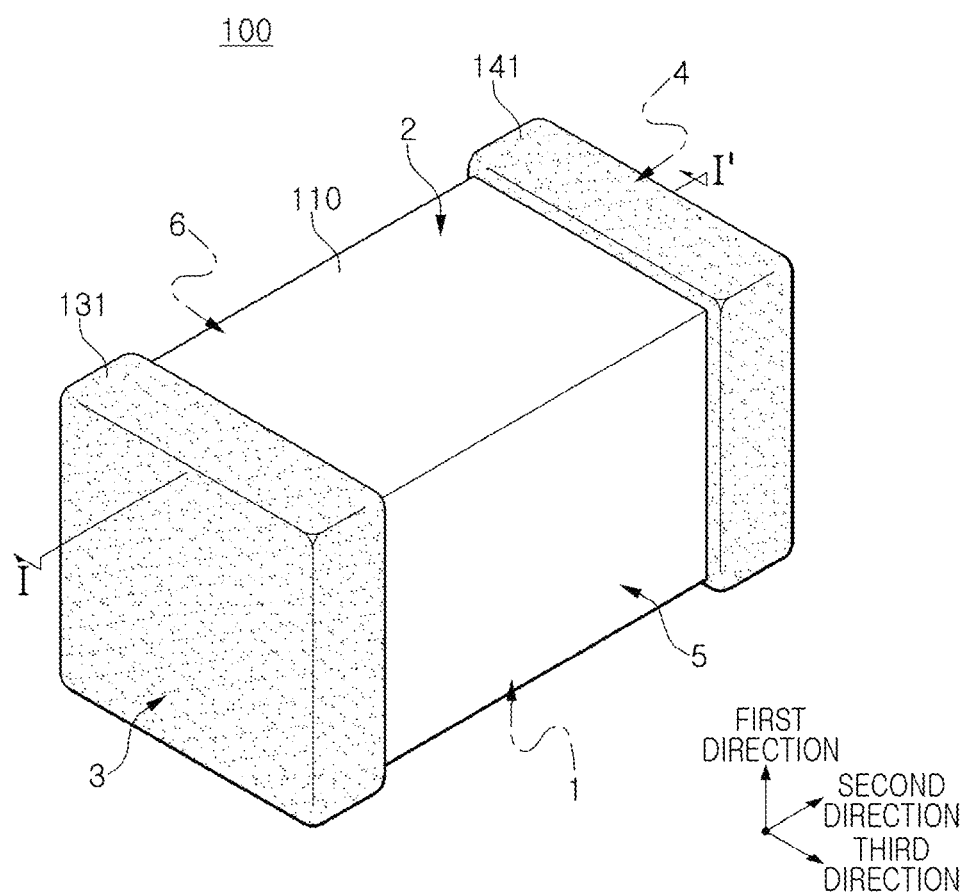
FIG. 1 is a perspective view schematically illustrating a multilayer capacitor according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements.

In the drawings, a first direction may be defined as a stacking direction or a thickness (T) direction, a second direction may be defined as a length (L) direction, and a third direction may be defined as a width (W) direction.

FIG. 1 is a perspective view schematically illustrating a multilayer capacitor according to an exemplary embodiment in the present disclosure.

Figure 2:
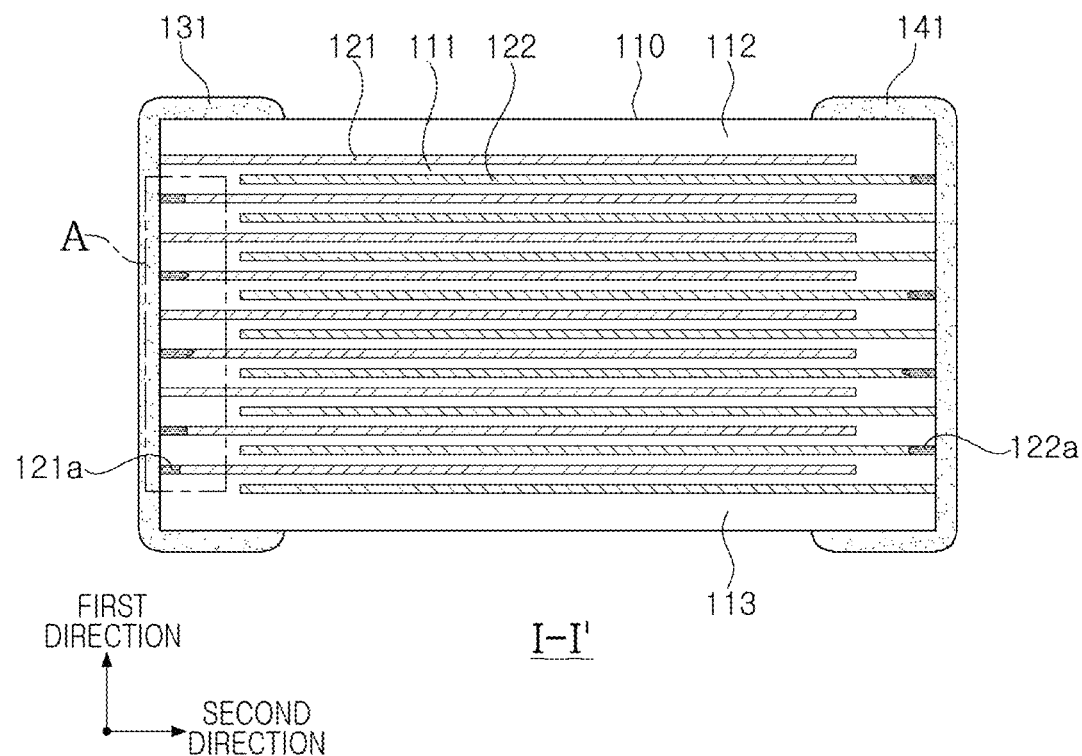
FIG. 2 is a cross-sectional view taken along line I-I' of FIG. 1.

FIG. 2 is a cross-sectional view taken along line I-I' of FIG. 1.

Figure 3:
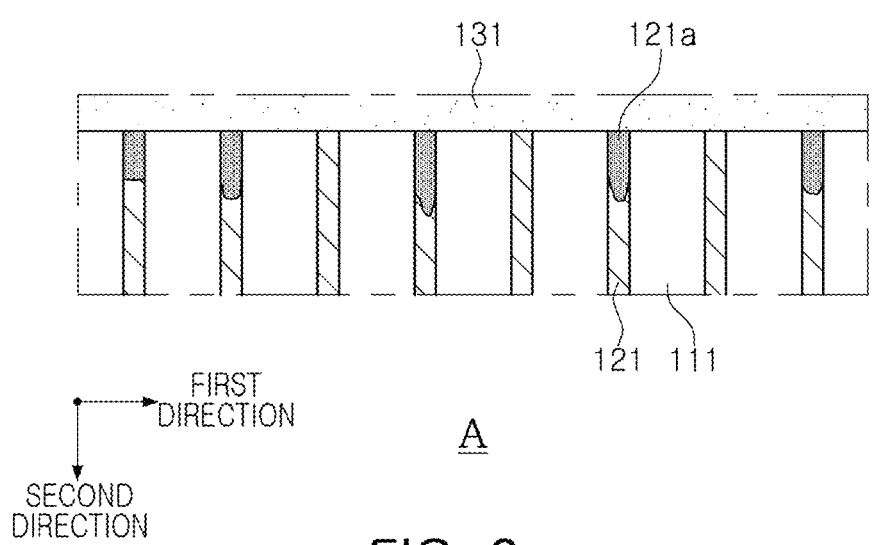
FIG. 3 is an enlarged view of a region A of FIG. 2.

FIG. 3 is an enlarged view of a region A of FIG. 2.

Figure 4:
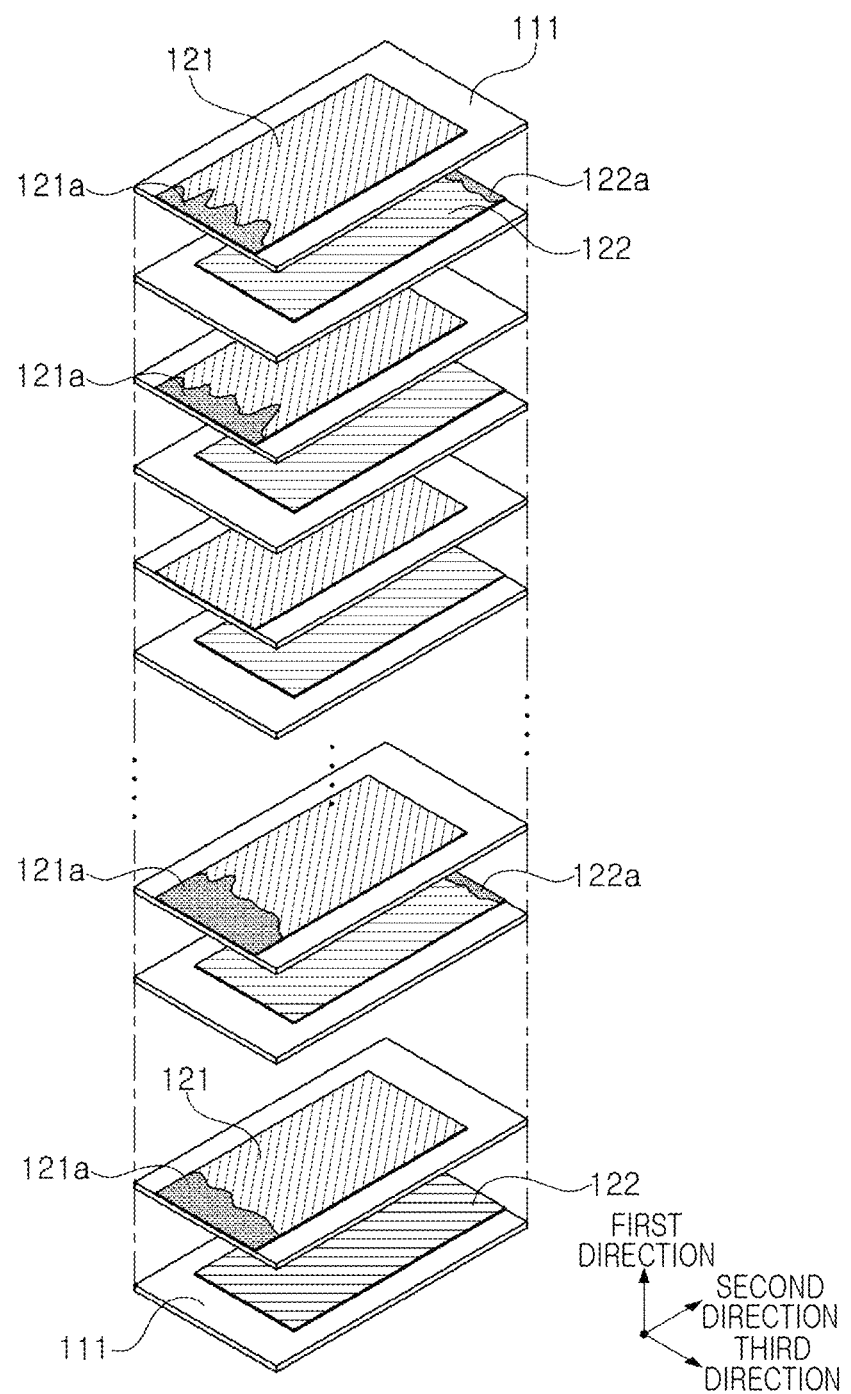
FIG. 4 is a schematic diagram illustrating an internal electrode according to an exemplary embodiment in the present disclosure.

FIG. 4 is a schematic diagram illustrating an internal electrode according to an exemplary embodiment in the present disclosure.

Figure 5:
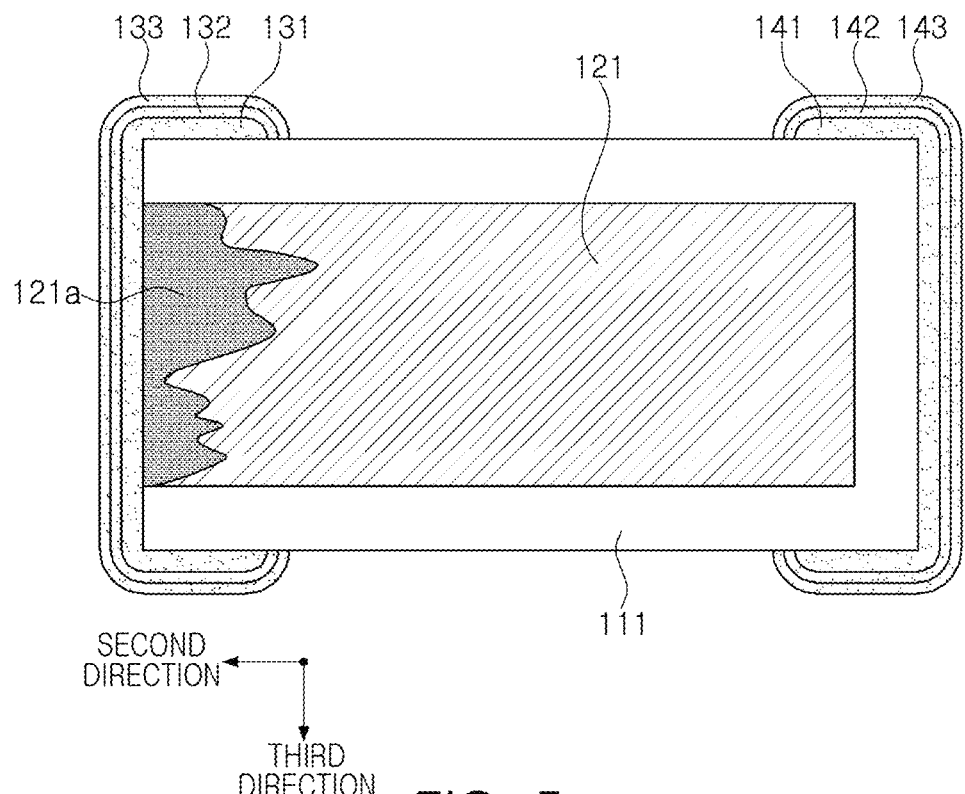
FIG. 5 is a cross-sectional view in second and third directions of FIG. 1, illustrating a cross-section in which a first internal electrode is observed.

FIG. 5 is a cross-sectional view in second and third directions of FIG. 1, illustrating a cross-section in which a first internal electrode is observed.

Figure 6:
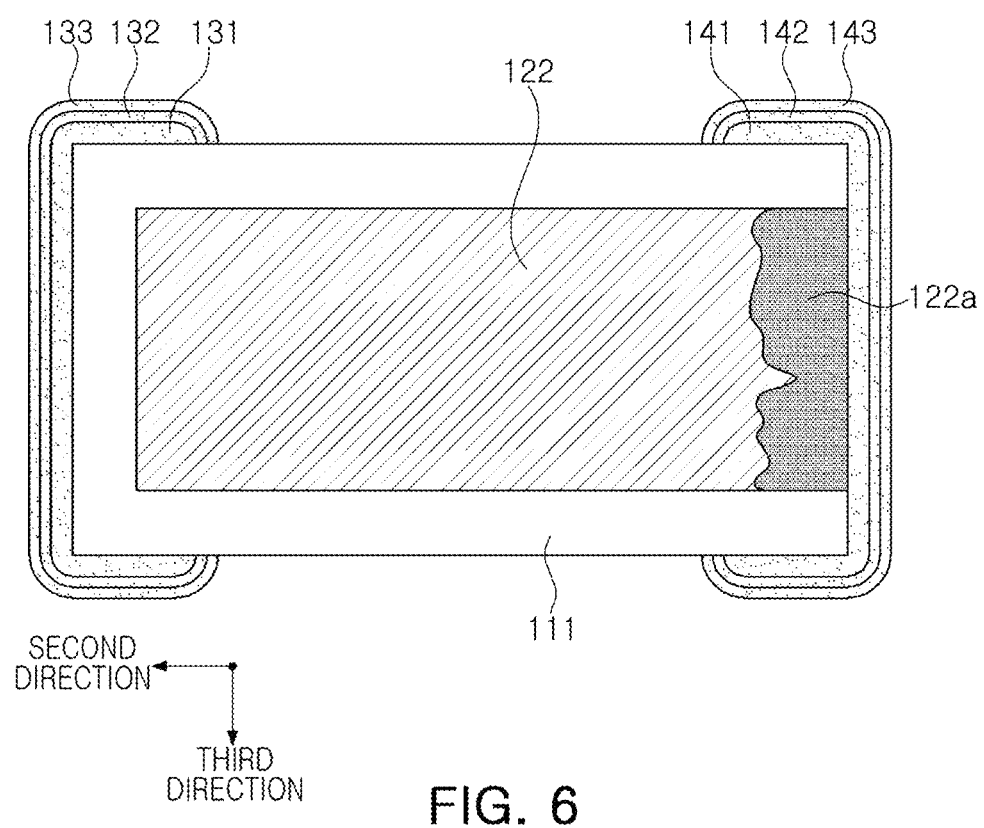
FIG. 6 is a cross-sectional view in the second and third directions of FIG. 1, illustrating a cross-section in which a second internal electrode is observed.

FIG. 6 is a cross-sectional view in the second and third directions of FIG. 1, illustrating a cross-section in which a second internal electrode is observed.

Hereinafter, a multilayer capacitor according to an exemplary embodiment in the present disclosure will be described in detail with reference to the drawings.

A multilayer capacitor 100 according to an exemplary embodiment in the present disclosure may include a body 110 including a dielectric layer 111 and a plurality of internal electrodes 121 and 122 stacked with the dielectric layer interposed therebetween and including a first conductive metal and external electrodes 131 and 141 disposed on an external surface of the body and including a second conductive metal, wherein the ratio of internal electrodes including an alloy region of the first and second conductive metals to the plurality of internal electrodes 121 and 122 (for example, a total number of the plurality of internal electrodes) is 40 to 80%.

There is no particular limitation to a specific shape of the body 110 but, as illustrated, the body 110 may have a hexahedral shape or a shape similar thereto. Due to shrinkage of ceramic powder included in the body 110 or polishing of corner portions during a firing process, the body 110 may have substantially a hexahedral shape, not a hexahedral shape with perfect straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacity may be obtained. For example, a barium titanate-based material, a lead composite perovskite-based material, or a strontium titanate-based material may be used. The barium titanate-based material may include a $BaTiO_3$-based ceramic powder, and an example of the ceramic powder may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

Here, a thickness of the dielectric layer 111 may be changed according to capacitance design of the multilayer ceramic capacitor 100, and a thickness of a first layer may be configured to be 0.1 to 10 μm after firing in consideration of the size and capacitance of the body 110, but the present disclosure is not limited thereto.

The body 110 may include the capacitance forming portion including the first internal electrode 121 and the second internal electrode 122 disposed to face each other with the dielectric layer 111 interposed therebetween and forming capacitance and cover portions 112 and 113 formed on upper and lower surface of the capacitance forming portion.

The upper and lower cover portions 112 and 113 may have the same material and configuration as those of the dielectric layer 111 of the capacitor forming portion except that the upper and lower cover portions 112 and 113 do not include internal electrodes. The upper and lower cover portions 112 and 113 may each have a thickness of 25 μm or less, but the present disclosure is not limited thereto.

The dielectric layer 111 and the cover portions 112 and 113 may be formed by applying a slurry formed to include ceramic powder such as barium titanate ($BaTiO_3$) on a carrier film and drying the slurry to prepare a plurality of ceramic green sheets and stacking the plurality of ceramic green sheets and sintering them.

The internal electrodes 121 and 122 may be alternately disposed with the dielectric layer 111, and the first internal electrode 121 and the second internal electrode 122 may be disposed to face each other with the dielectric layer 111 interposed therebetween.

That is, the first and second internal electrodes 121 and 122 are a pair of electrodes having different polarities, may be alternately exposed to the third and fourth surfaces 3 and 4 of the body 110 in the stacking direction of the dielectric layer 111 with the dielectric layer 111 therebetween, and may be electrically insulated from each other by the dielectric layer 111 disposed therebetween. Accordingly, the first internal electrode 121 may be connected to the first external electrode 131 on the third surface 3, and the second internal electrode 122 may be connected to the second external electrode 141 on the fourth surface 4.

Thicknesses of the first and second internal electrodes 121 and 122 may be determined according to purpose, and may be determined to be within a range of 0.2 to 1.0 μm in consideration of the size and capacity of the body 110, but the present disclosure is not limited thereto.

A first conductive metal included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, and preferably include nickel (Ni).

400 or more layers of the internal electrodes 121 and 122 may be stacked to implement the multilayer capacitor 100 having high capacitance, but the present disclosure is not limited thereto.

The internal electrodes 121 and 122 may be formed by printing a conductive paste for internal electrodes including the first conductive metal to have a predetermined thickness on a ceramic green sheet. As a method of printing the conductive paste for internal electrodes, a screen-printing method or a gravure printing method may be used, but the present disclosure is not limited thereto.

The external electrodes 131 and 141 are disposed outside the body 110 and may include a second conductive metal. In this case, the second conductive metal included in the external electrodes 131 and 141 may be one or more of silver (Ag), lead (Pb), platinum (Pt), nickel (Ni), copper (Cu), and alloys thereof, and more preferably, copper (Cu).

The external electrodes 131 and 141 may include a first external electrode 131 disposed on the third surface of the body 110 and a second external electrode 141 disposed on the fourth surface of the body 110, and the first and second external electrodes 131 and 141 may be disposed to extend to portions of the first and second surfaces 1 and 2 of the body 110 and may be disposed to the fifth and sixth surfaces 5 and 6 of the body 110.

The external electrodes 131 and 141 may be formed, for example, by dipping the third and fourth surfaces 3 and 4 of the body 110 into a conductive paste for external electrodes including the second conductive metal and glass and then performing firing. Accordingly, the external electrodes 131 and 141 may be fired electrodes including the second conductive metal and glass.

According to an exemplary embodiment in the present disclosure, the ratio of internal electrodes including the alloy regions 121a and 122a of the first and second conductive metals to the plurality of internal electrodes 121 and 122 may be 40 to 80%. In this case, the alloy regions 121a and 122a may be formed at the end portions of the internal electrodes 121 and 122 connected to the external electrodes 131 and 141.

The alloy regions 121a and 122a may be regions in which the second conductive metal is diffused toward the internal electrodes 121 and 122. Specifically, the alloy regions 121a and 122a may be formed as the second conductive metal is diffused toward the internal electrodes 121 and 122 in the process of applying a conductive paste for an external electrode to the body 110 and performing firing.

For example, when the first conductive metal includes nickel (Ni) and the second conductive metal includes copper (Cu), copper (Cu) may be diffused toward the internal electrodes 121 and 122 during a firing process of the external electrodes 131 and 141. In this case, the alloy regions 121a and 122a may include a Ni—Cu alloy.

Here, since the ratio of the internal electrodes including the alloy regions 121a and 122a of the first and second conductive metals to the plurality of internal electrodes 121 and 122, satisfies 40 to 80%, a bonding strength between the internal electrodes 121 and 122 and the external electrodes 131 and 141 may be improved to prevent penetration of external moisture and a plating solution.

The alloy regions 121a and 122a may strongly bond an interface between the internal electrodes 121 and 122 and the external electrodes 131 and 141. Accordingly, external moisture and a plating solution may be prevented from penetrating into the interface between the internal electrodes 121 and 122 and the external electrodes 131 and 141. Accordingly, moisture resistance reliability and high temperature insulation resistance (IR) characteristics of the multilayer capacitor 100 may be improved.

In addition, by adjusting the ratio of the internal electrodes 121 and 122 including the alloy regions 121a and 122a, occurrence of radiation cracks and bridge cracks caused by volume expansion of the internal electrodes 121 and 122 may be prevented. Accordingly, penetration of external moisture and a plating solution through cracks may be prevented.

If the ratio of the internal electrodes including the alloy regions 121a and 122a of the first and second conductive metals to the plurality of internal electrodes 121 and 122, is less than 40%, a bonding strength between the internal electrodes 121 and 122 and the external electrodes 131 and 141 may be degraded. Accordingly, external moisture and a plating solution may penetrate from the interface between the internal electrodes 121 and 122 and the external electrodes 131 and 141, and thus reliability and high temperature IR characteristics of the multilayer capacitor 100 may be deteriorated.

If the ratio of the internal electrodes including the alloy regions 121a and 122a of the first and second conductive metals to the plurality of internal electrodes 121 and 122, exceeds 80%, the number of internal electrodes 121 and 122 expanded in volume due to the formation of the alloy regions 121a and 121b may be excessive to cause radiation cracks in the body 110. For example, when the first conductive metal is nickel (Ni) and the second conductive metal is copper (Cu), a diffusion rate of copper (Cu) is faster than that of nickel (Ni), so that the volume of the internal electrodes 121 and 122 may be expanded. Accordingly, radiation cracks may occur in the body 110 due to the action of internal stress. Also, bridge cracks may occur across the plurality of internal electrodes 121 and 122 in the stacking direction of the internal electrodes 121 and 122. Accordingly, external moisture may penetrate through the crack, and the bending strength and reliability of the multilayer capacitor 100 may be deteriorated.

As will be described later, the ratio of the internal electrodes 121 and 122 including the alloy regions 121a and 122a of the first and second conductive metals to the plurality of internal electrodes 121 and 122, may be measured by SEM-EPMA.

The number of internal electrodes 121 and 122 including the alloy regions 121a and 122a may be adjusted by appropriately setting a firing temperature. If the firing temperature is too low, the ratio of the internal electrodes including the alloy regions 121a and 122a of the first and second conductive metals to the plurality of internal electrodes 121 and 122, may be less than 40%. In addition, if the firing temperature is too high, the ratio of the internal electrodes including the alloy regions 121a and 122a of the first and second conductive metals to the plurality of internal electrodes 121 and 122 may exceed 80%.

For example, the firing temperature may be 600 to 700° C., or 600 to less than 700° C., but the present disclosure is not limited thereto, and may be appropriately adjusted depending on a composition of the internal electrodes 121 and 122 and the external electrodes 131 and 141 and a firing time.

In an exemplary embodiment in the present disclosure, a detection intensity of the second conductive metal of the alloy regions 121a and 122a by the EPMA may be 40% or more of a detection intensity of the second conductive metal of the external electrodes 131 and 141 by the EPMA. In this case, the detection intensity of the second conductive metal of the alloy regions 121a and 122a may be measured in a region within 3 μm from the interface between the internal electrodes 121 and 122 and the external electrodes 131 and 141 toward the internal electrodes 121 and 122.

The detection intensity of the second conductive metal may be measured by, for example, a scanning electron microscope-electron probe micro analyzer (SEM-EPMA) in cross sections of the multilayer capacitor 100 in the first direction and the second direction. As the detection intensity of the second conductive metal is higher, the ratio of the second conductive metal included in the analysis point is high.

When the detection intensity of the second conductive metal of the alloy regions 121a and 122a is 40% or more of the detection intensity of the second conductive metal of the external electrodes 131 and 141, the second conductive metal may be sufficiently diffused to the alloy regions 121a and 122a, thereby improving the bonding strength between the internal electrodes 121 and 122 and the external electrodes 131 and 141.

Conversely, if the detection intensity of the second conductive metal of the alloy regions 121a and 122a is less than 40% of the detection intensity of the second conductive metal of the external electrodes 131 and 141, the bonding strength between the internal electrodes 121 and 122 and the external electrodes 131 and 141 may be reduced.

In this case, the detection intensity of the second conductive metal by EPMA of the alloy regions 121a and 122a may refer to a maximum value among values measured at a plurality of analysis points or may be an average value of the plurality of values. In addition, the detection intensity of the second conductive metal by EPMA analysis of the external electrodes 131 and 141 may refer to a maximum value among values measured at a plurality of analysis points.

In an exemplary embodiment in the present disclosure, one end of the alloy regions 121a and 122a connected to the external electrodes 131 and 141 may have a higher ratio of the second conductive metal than the other end. A ratio of the second conductive metal at one end and the other end may be measured by SEM-EPMA. For example, the cross-sections of the multilayer capacitor 100 in the first direction and the second direction may be measured by comparing the detection intensity of the second conductive metal through SEM-EPMA.

Since one end connected to the external electrodes 131 and 141 has a higher ratio of the second conductive metal than the other end, the bonding strength between the internal electrodes 121 and 122 and the external electrodes 131 and 141 may be improved, and accordingly, moisture resistance reliability and high temperature IR characteristics may be improved.

In an exemplary embodiment in the present disclosure, at least two of the plurality of internal electrodes 121 and 122 may have different lengths of the alloy regions 121a and 122a. Here, the length refers to a length in the second direction.

The lengths of the alloy regions 121a and 122a may refer to lengths in cross-sections of the multilayer capacitor 100 in the first direction and the second direction as shown in FIG. 3. In addition, the length of the alloy regions 121a and 122a may refer to a maximum value of the lengths of the alloy regions 121a and 122a in cross-sections in the second and third direction, as shown in FIG. 4.

The lengths of the alloy regions 121a and 122a may be measured by analyzing cross-sections of the multilayer capacitor 100 in the first and second directions or cross-sections of the multilayer capacitor 100 in the second and third directions through SEM-EPMA.

In an exemplary embodiment in the present disclosure, plating layers 132, 133, 142, and 143 may be disposed on the external electrodes 131 and 141. That is, the first plating layers 132 and 133 may be disposed on the first external electrode 131, and the second plating layers 142 and 143 may be formed on the second external electrode 141.

The plating layers 132, 133, 142, and 143 serve to improve mounting characteristics of the multilayer capacitor 100. The plating layers 132, 133, 142, and 143 may include one or more of Ni, Sn, Cu, Pd, and alloys thereof, and may include a plurality of layers.

In an exemplary embodiment in the present disclosure, the plating layers 132, 133, 142, and 143 may include nickel (Ni) plating layers 132 and 142 and tin (Sn) plating layers 133 and 143 formed to be sequentially stacked on the external electrodes 131 and 141. That is, the first nickel plating layer 132 and the first tin plating layer 133 may be sequentially formed on the first external electrode 131, and the second nickel plating layer 142 and the second tin plating layer 143 may be sequentially formed on the second external electrode 141.

The nickel plating layers 132 and 142 may serve to prevent dissolution of solder when the multilayer capacitor 100 is mounted. In addition, the tin plating layers 133 and 143 formed on the nickel plating layers 132 and 142 may serve to improve solder wettability when the multilayer capacitor 100 is mounted.

The nickel plating layers 132 and 142 and the tin plating layers 133 and 143 may be formed by sputtering or electrolytic deposition, but the present disclosure is not limited thereto.

Example

Table 1 shows evaluation of reliability and crack occurrence of the multilayer capacitor 100 according to the ratio of the internal electrodes including the alloy regions of the first and second conductive metals to the plurality of internal electrodes 121 and 122. Here, the multilayer capacitor 100 was manufactured using nickel (Ni) as the first conductive metal and copper (Cu) as the second conductive metal.

Figure 7A:
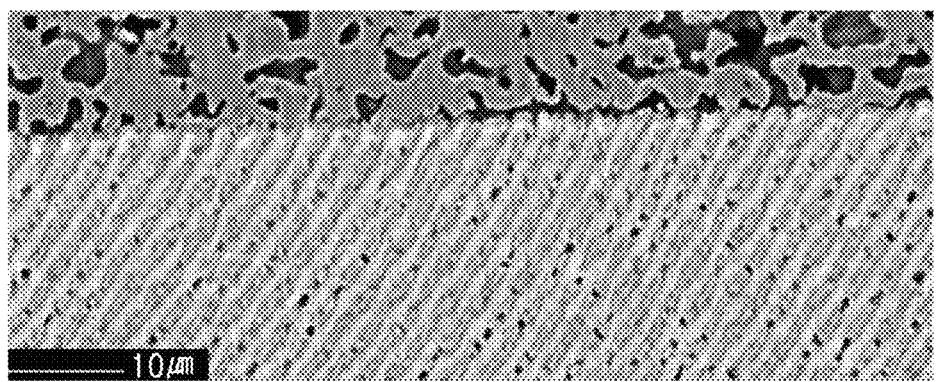
FIG. 7A is an image of a cross-section of a multilayer capacitor according to an exemplary embodiment in the present disclosure with a scanning electron microscope (SEM)

FIG. 7A is an image of a cross-section of a multilayer capacitor according to an exemplary embodiment in the present disclosure, captured with a scanning electron microscope (SEM). Specifically, the image was captured such that a portion of an interface of the internal electrodes 121 and 122 and the external electrodes 131 and 141 is included in a region of length in the first direction×length in the second direction=80 μm×30 μm in the cross-sections of the multilayer capacitor 100 in the first direction and the second direction.

Figure 7B:
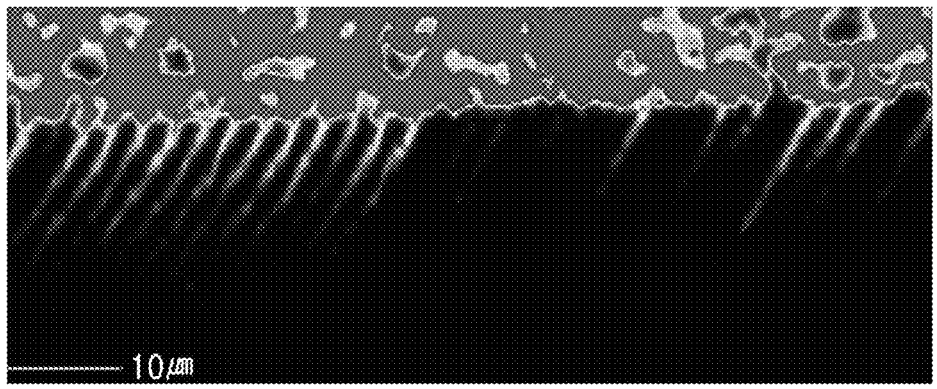
FIG. 7B is an image obtained by measuring a detection intensity of copper (Cu) through electron probe micro analysis (EPMA) in the image of FIG. 7A.

FIG. 7B is an image obtained by measuring a detection intensity of copper (Cu) through electron probe micro analysis (EPMA) in the image of FIG. 7A. As the detection intensity of copper (Cu) is higher, the corresponding region appears in a darker shade of gray. Accordingly, it can be seen that the external electrodes 131 and 141 shown in the upper part of FIG. 7B have a high detection intensity of copper (Cu), so that the corresponding region appears in dark gray. Additionally, it can be seen that the internal electrodes 121 and 122 shown in the lower part of FIG. 7B are black because the detection intensity of copper (Cu) does not appear.

In addition, based on the detection intensity of copper (Cu) appearing at the end portion of the internal electrodes 121 and 122 connected to the external electrodes 131 and 141, it can be seen that the nickel (Ni)-copper (Cu) alloy regions 121a and 122a are formed at the end portions connected to the external electrodes 131 and 141. Additionally, it can be seen that, among the plurality of internal electrodes 121 and 122, there are internal electrodes 121 and 122 in which the detection intensity of copper (Cu) does not appear.

Thereafter, a detection intensity of copper (Cu) was measured through EPMA in a region within 3 μm of the interface between the internal electrodes 121 and 122 and the external electrodes 131 and 141. Here, when the detection intensity of copper (Cu) in the region was 40% or more of a maximum value of the detection intensity of copper (Cu) in the external electrodes 131 and 141, it was determined that the alloy regions 121a and 122a were formed. That is, when the detection intensity of copper (Cu) in the region was less than 40% of the maximum value of the detection intensity of the copper (Cu) in the external electrodes 131 and 141, it was determined that the alloy regions 121a and 122a were not formed.

Thereafter, in FIG. 7B, a total number of internal electrodes 121 and 122 and the number of internal electrodes 121 and 122 in which the alloy regions 121a and 122a were formed were measured to measure a ratio thereof, and the ratios measured for respective samples are described in Table 1.

Reliability evaluation of the multilayer capacitor 100 was performed by measuring high temperature IR. After applying a voltage of 10V under the conditions of 85° C. and 85% of relative humidity, the reliability of the multilayer capacitor 100 was evaluated according to the degree of deterioration of high temperature IR. Here, high-temperature IR of 400 samples was measured for each sample number, and a case in which the IR value was $10^8$ or greater was determined to be normal and a case in which the IR value was less than $10^6$ was determined to be defective, and the number of defects occurring for each sample number was measured.

For the occurrence of cracks, cross-sections of each prepared sample in the first and second directions were analyzed through SEM-EPMA, and then, the occurrence of radial cracks and bridge cracks was observed. Here, a case in which cracks did not occur in all samples was determined to be normal (○), and a case in which cracks occurred was determined to be defective (x).

TABLE 1

| Sample No. | Ratio (%) | Evaluation of reliability (deterioration rate) | Occurrence of crack |
|---|---|---|---|
| 1* | 15 | 6/400 | X |
| 2* | 24 | 7/400 | X |
| 3* | 29 | 5/400 | X |
| 4* | 34 | 4/400 | X |
| 5* | 37 | 3/400 | X |
| 6 | 40 | 0/400 | X |
| 7 | 68 | 0/400 | X |
| 8 | 69 | 0/400 | X |
| 9 | 77 | 0/400 | X |
| 10* | 81 | 9/400 | ○ |
| 11* | 85 | 11/400 | ○ |
| 12* | 100 | 17/400 | ○ |

*is Comparative Example

In Comparative Examples 1* to 5*, the ratio of internal electrodes including the Ni—Cu alloy regions 121a and 122a to the plurality of internal electrodes 121 and 122 was less than 40%. Thus, it can be seen that a defect with the IR deterioration occurred in the sample, thereby reducing the reliability of the multilayer capacitor 100. This is because the ratio of the alloy regions 121a and 122a is not sufficient, so that the bonding strength between the internal electrodes 121 and 122 and the external electrodes 131 and 141 is lowered, and external moisture penetrates to cause IR deterioration.

In Comparative Examples 10* to 12*, the ratio of the internal electrodes including the Ni—Cu alloy regions 121a and 122a to the plurality of internal electrodes 121 and 122 exceeded 80%. Accordingly, it can be seen that radiation cracks or bridge cracks occurred in each sample. In Comparative Examples 10* to 12*, it can be seen that cracks occurred due to excessive volume expansion of the internal electrodes 121 and 122 and external moisture or the like penetrated through the cracks to cause IR deterioration.

Figure 8:
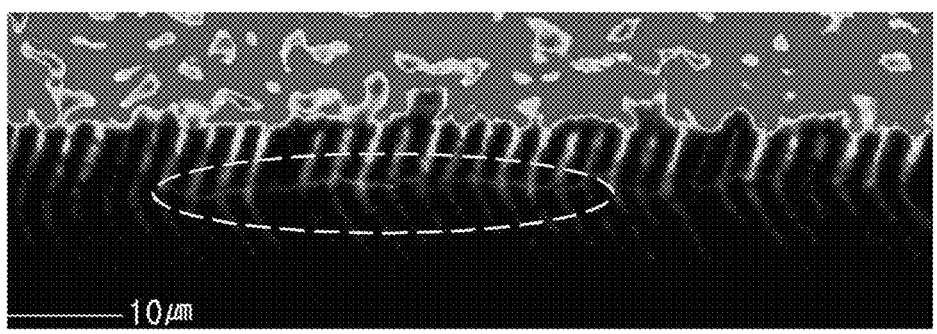
FIG. 8 is an image of a comparative example in which cracks occur.

FIG. 8 is an image of a comparative example in which cracks occur. Referring to FIG. 8, it can be seen that bridge cracks occurred across the plurality of internal electrodes 121 and 122 in a stacking direction of the internal electrodes 121 and 122. This is because the ratio of the alloy regions 121a and 122a is excessive, so that internal stress acts according to volume expansion of the internal electrodes 121 and 122.

Meanwhile, in Examples 6 to 9, it can be seen that the ratio of the internal electrodes 121 and 122 including the Ni—Cu alloy regions 121a and 122a to the plurality of internal electrodes 121 and 122 satisfies 40 to 80%, so the reliability is excellent and no cracks occurred.

Additionally, referring to FIG. 7B, it can be seen that, the detection intensity of copper (Cu) at one end connected to the external electrodes 131 and 141 in the alloy regions 121a and 122a is higher than that of the other end, and thus, one end connected to the external electrodes 131 and 141 has a higher ratio of copper (Cu) than the other end. In addition, referring to FIG. 7B, it can be seen that a thickness of the region in which the detection intensity of copper (Cu) appears is reduced in a direction away from the interface with the external electrodes 131 and 141.

As set forth above, one of the various effects of the present disclosure is to improve the moisture resistance reliability and high temperature IR characteristics of the multilayer capacitor.

One of the various effects of the present disclosure is to improve the bonding strength between the internal electrode and the external electrode to prevent penetration of moisture and a plating solution from the outside.

One of the various effects of the present disclosure is to prevent the occurrence of cracks due to excessive alloy formation.

While example exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a dielectric layer and a plurality of internal electrodes stacked with the dielectric layer interposed therebetween and including a first conductive metal; and
external electrodes disposed on an external surface of the body and including a second conductive metal,
wherein a ratio of internal electrodes including an alloy region of the first and second conductive metals to the plurality of internal electrodes is 40 to 80%,
wherein a detection intensity of the second conductive metal of the alloy region by electron probe micro analysis (EPMA) is 40% or more of a detection intensity of the second conductive metal of the external electrodes by EPMA, and
wherein the plurality of internal electrodes includes 400 or more layers of internal electrodes.

2. The multilayer capacitor of claim 1, wherein the alloy region is disposed at an end portion of the internal electrodes connected to one of the external electrodes.

3. The multilayer capacitor of claim 1, wherein the detection intensity of the second conductive metal of the alloy region is measured in a region within 3 μm from an interface between the internal electrodes and one of the external electrodes toward the internal electrodes.

4. The multilayer capacitor of claim 1, wherein the alloy region is a region in which the second conductive metal is diffused toward the internal electrodes.

5. The multilayer capacitor of claim 1, wherein one end of the alloy region connected to one of the external electrodes has a proportion of the second conductive metal higher than a proportion of the other end of the alloy region.

6. The multilayer capacitor of claim 1, wherein lengths of the alloy regions of at least two of the plurality of internal electrodes are different from each other.

7. The multilayer capacitor of claim 1, wherein the first conductive metal includes nickel (Ni).

8. The multilayer capacitor of claim 1, wherein the second conductive metal includes copper (Cu).

9. The multilayer capacitor of claim 1, wherein the alloy region includes an Ni—Cu alloy.

10. The multilayer capacitor of claim 1, further comprising a plating layer disposed on at least one of the external electrodes.

11. The multilayer capacitor of claim 10, wherein the plating layer includes a nickel (Ni) plating layer and a tin (Sn) plating layer sequentially stacked on the at least one of the external electrodes.

12. The multilayer capacitor of claim 1, wherein a thickness of the plurality of internal electrodes is in a range of 0.2 to 1.0 μm.

13. The multilayer capacitor of claim 1, wherein the alloy region directly contacts the external electrode.

14. The multilayer capacitor of claim 1, wherein the multilayer capacitor is formed at a firing temperature of 600 to less than 700° C.

* * * * *